United States Patent
Coghlan et al.

(10) Patent No.: US 9,288,671 B2
(45) Date of Patent: Mar. 15, 2016

(54) DEVICE AUTHENTICATION METHOD AND DEVICES

(75) Inventors: Finbarr Coghlan, Maynooth (IE); Robert Ryan, Donabate (IE); Ian Smith, Dunleer (IE)

(73) Assignee: ACCURIS TECHNOLOGIES LIMITED, Dublin (IE)

( * ) Notice: Subject to any disclaimer, the term of this patent is extended or adjusted under 35 U.S.C. 154(b) by 0 days.

(21) Appl. No.: 14/125,550

(22) PCT Filed: Jun. 15, 2012

(86) PCT No.: PCT/IE2012/000029
§ 371 (c)(1),
(2), (4) Date: Dec. 11, 2013

(87) PCT Pub. No.: WO2012/172533
PCT Pub. Date: Dec. 20, 2012

(65) Prior Publication Data
US 2014/0115676 A1   Apr. 24, 2014

Related U.S. Application Data

(60) Provisional application No. 61/457,840, filed on Jun. 16, 2011.

(51) Int. Cl.
H04L 29/06  (2006.01)
H04W 12/06  (2009.01)

(52) U.S. Cl.
CPC ............. *H04W 12/06* (2013.01); *H04L 63/162* (2013.01); *H04L 63/166* (2013.01)

(58) Field of Classification Search
USPC .......................................................... 726/6
See application file for complete search history.

(56) References Cited

U.S. PATENT DOCUMENTS 8,555,361 B2 * 10/2013 Nakhjiri et al. .................... 726/7
8,850,036 B2 *  9/2014 Rozinov et al. ............... 709/228
(Continued)

FOREIGN PATENT DOCUMENTS

EP       2348763 A2     7/2011
EP       2348763 A3     8/2011
WO   2006/013150 A1     2/2006

OTHER PUBLICATIONS

IP-based Access Network Infrastructure for Next Generation Wireless Data Networks|https://www.scss.tcd.ie/Hitesh.Tewari/papers/pcs.pdf|Ramjee et al.|pp. 1-24|2000.*
International preliminary report on patentability; PCT/IE2012/000029; Dec. 17, 2013.
(Continued)

*Primary Examiner* — Mahfuzur Rahman
(74) *Attorney, Agent, or Firm* — Studebaker & Brackett PC

(57) ABSTRACT

In a method for authenticating a device on a wireless local area network (WLAN) there is a once-off registration phase in which the device sends registration data in a MO SMS via the mobile network to the authentication system, and the authentication system performs a query to this mobile network to validate the subscriber and resolve the subscriber and device identifiers. The device receives network access information from the authentication system, allowing it to generate network access credentials on an on-going basis. This is permanent unless the registration is revoked due, for example, to the device being stolen. The network access information may be provided by the authentication system generating and signing a unique subscriber certificate during registration, and the device downloading it. The device uses the signed certificate to generate and encrypt the network access credentials for the network access.

22 Claims, 4 Drawing Sheets

(56) References Cited

U.S. PATENT DOCUMENTS

| | | | |
|---|---|---|---|
| 2006/0004643 A1* | 1/2006 | Stadelmann et al. | 705/34 |
| 2006/0253703 A1* | 11/2006 | Eronen et al. | 713/156 |
| 2009/0270099 A1* | 10/2009 | Gallagher et al. | 455/435.1 |
| 2013/0073856 A1* | 3/2013 | Sherkin et al. | 713/176 |

OTHER PUBLICATIONS

International Search Report; PCT/IE2012/000029; Sep. 17, 2012.

B. Anton et al.; "Best Current Practice for Wireless Internet Service Provider (WISP) Roaming"; Wireless ISP Roaming; Feb. 1, 2003; pp. 1-37; XP-002963834.

* cited by examiner

DEVICE AUTHENTICATION METHOD AND DEVICES

The invention relates to authentication of mobile devices in wireless local area networks.

There are various constraints which arise from use of some mobile devices, including some smartphones. For example, at present some mobile devices are not programmed to perform Extensible Authentication Protocol (EAP) authentication, and indeed some Wi-Fi networks also do not support EAP.

Also, many devices do not permit third-party software access to the SIM for the purpose of SIM authentication. In particular, at least one type of device does not even allow access to the SIM to read parameters such as the IMSI.

Most public Wi-Fi networks (such as those run by WISPs) do not support IEEE 802.1x. But most WISPs support capability which is best described as WBA's WISPr 1.0. WISPr allows smart clients running on mobile devices to automate the procedure of logging onto Wi-Fi services. WISPr 1.0 enables this logging-in as a HTTP procedure, using username/password as the end-user identity.

WO2010/115455 (Togewa Holding AG) describes a method and system for authenticating a network node in a UAM-based WLAN network.

The invention is directed towards achieving more versatile authentication of mobile devices (including phones, PDAs and laptops) in wireless local area networks. Another object is to provide a technical architecture to enable more transparent and faster WLAN access as seen by the subscriber.

SUMMARY OF THE INVENTION

According to the invention, there is provided a wireless network access method performed by a subscriber device subscribed to a mobile network, a WLAN, and an authentication system, the method comprising the steps of:

in a once-off registration phase:
- the device sending registration data via the mobile network to the authentication system, and
- the authentication system performing a query to the mobile network of the subscriber to validate the subscriber and resolve the subscriber and device identifiers, and
- device receiving network access information from the authentication system, said network access information allowing it to generate network access credentials for subsequent network access; and in a network access phase:
- the device generating network access credentials using said network access information previously received from the authentication system during the registration phase.

By having a once-off registration the process of logging on to WLANs is much simpler than heretofore, as registration is not required every time. It is envisaged that the registration will last until there is a major event such as theft of the device and cancellation or re-setting of a subscriber account or SIM.

In one embodiment, the device downloads client software, and said client software performs the device part of the registration phase and the device network access operations.

In one embodiment, the authentication system generates and signs a unique subscriber certificate during registration, and the device downloads it as part of said network access information.

In one embodiment, the device uses said certificate to generate and encrypt the network access credentials during the network access phase. In one embodiment, the registration data is sent in a MO SMS. In one embodiment, the certificate includes both subscriber and device identifiers.

Preferably, the method includes the step of the device sending a token to the authentication system, the authentication system using the token to sign the certificate, and the device using the token to subsequently retrieve the signed certificate. In one embodiment, the token is a nonce with a globally unique identifier (GUID) unique reference number.

In one embodiment, the device stores the certificate securely in the device.

In one embodiment, during the network access phase the device automatically discovers a preferred WLAN service.

In one embodiment, the discovery is performed using network selection data included in the network access information. In one embodiment, the network selection data includes service set identifiers, SSIDs.

In one embodiment, the device generates the network access credentials transparently to the subscriber.

In one embodiment, the network access credentials are transported using the RADIUS or the DIAMETER protocols.

In one embodiment, the network access credentials are not stored, being algorithmically generated for every network access.

In one embodiment, the method comprises the further step of an application on the device using the received network access information to communicate with a server in the same trusted domain.

In one embodiment, the device application and the server perform mutual authentication.

In one embodiment, the device includes a plurality of applications adapted to use the received network access information to authenticate itself to a server in the same trusted domain.

In another aspect, the invention provides a subscriber mobile device comprising a processor, a radiation transmitter and a radiation receiver, wherein the processor is adapted to perform device registration and network access steps of a method as described in any embodiment.

In another aspect, the invention provides an authentication system comprising a processor, an interface for communication with wireless local area networks, and an interface for communication with a subscriber mobile network, wherein the processor is adapted to perform authentication system registration and network access steps of a method as described in any embodiment.

In another aspect, the invention provides a computer readable medium comprising software code adapted to be read by a digital processor to perform the device registration and network access steps as described in any embodiment.

In another aspect, the invention provides a computer readable medium comprising software code adapted to be read by a digital processor to perform the authentication system registration and network access steps as described in any embodiment.

DETAILED DESCRIPTION OF THE INVENTION

Brief Description of the Drawings

The invention will be more clearly understood from the following description of some embodiments thereof, given by way of example only with reference to the accompanying drawings in which:—

GLOSSARY

3GPP Third Generation Partnership Project
AAA Authentication, Authorization, and Accounting
AKA Authentication and Key Agreement
API Application Programming Interface
ASN Access Serving Network
CSR Certificate Signing Request
EAP Extensible Authentication Protocol
GSMA GSM Association
HLR Home Location Register
HSS Home Subscriber Server
HTTP Hypertext Transfer Protocol
ICCID unique serial number
IEEE Institute of Electrical and Electronics Engineers
IMEI International Mobile Equipment Identity
IMSI International Mobile Subscriber Identity
IP Internet Protocol
ITU International Telecommunications Union
LAN Local Area Network
MAC-address Media Access Control address
MAP Mobile Application Part
MD5 Message Digest 5
MIN/ESN Mobile Identification Number/Electronic Serial Number
MSISDN Mobile Subscriber Integrated Services Digital Network Number
MSP Mobile Service Provider
MO SMS Mobile-Originated Short Message Service
MS Mobile Subscription
MSP Mobile Service Provider
MT SMS Mobile-Terminated Short Message Service
RADIUS Remote Authentication Dial In User Service
RSA Rivest, Shamir and Adleman Algorithm
SCEP Simple Certificate Enrolment Protocol
SIGTRAN Signalling Transport
SIM Subscriber Identification Module
SMS Short Message Service
SCEP Simple Certificate Enrolment Protocol
SS7 Signalling System 7
SSIDs Service Set IDentifiers
SSL Secure Socket Layer
SME Short Messaging Entity
SRI-SM Send Routing Information-Short Message
TCP/IP Transmission Control Protocol/Internet Protocol
TLS Transport Layer Security
TP-OA Transport-Protocol Originating Address
UICC-ID Universal Integrated Circuit Card Identity
UDID Unique Device Identifier
UI User Interface
URL Uniform Resource Locator
VoIP Voice over IP
VPN Virtual Private Network
Wi-Fi Wireless Fidelity
WISP Wireless Internet Service Provider
WISPr Wireless Internet Service Provider roaming
XML Extensible Markup Language

DESCRIPTION OF THE EMBODIMENTS

Figure 1:
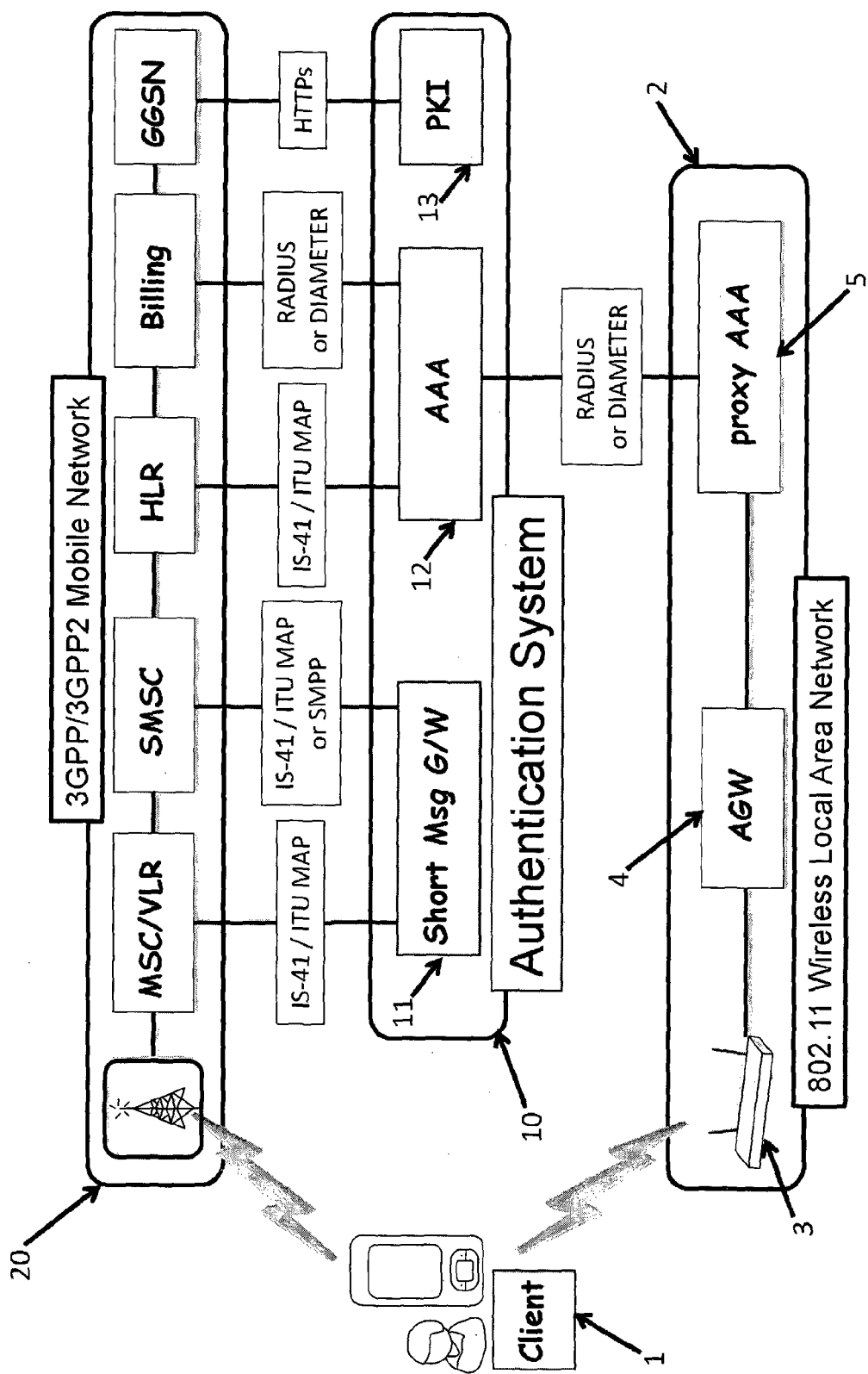
FIG. 1 shows the architecture of a system of the invention including a user device, authentication servers, and mobile network elements.

Referring to FIG. 1 for a wireless local area network, WLAN access and authentication equipment includes a subscriber device 1 having connectivity software client. Also, there is an 802.11 wireless local area network (WLAN) 2, with an access point 3, an access gateway (AGW) 4, and a proxy AAA server 5. Finally, there is an authentication system 10, with a short message gateway 11, an AAA server 12, and a PKI server 13.

The authorisation system 10 (also referred to in this specification as "AccuROAM") communicates with the subscriber's 3GPP/3GPP2 home mobile network 20, having the conventional network elements namely an MSC, a VLR, an SMSC, a HLR, a billing server, and a GGSN.

The device 1 client software is designed to run as a smart Wi-Fi connection manager to deliver seamless attachment to owned and roaming partner Wi-Fi networks (hotspots). It works with almost all currently available mobile devices (phones, tablets, laptops, etc.) with operating systems such as Apple iOS™, Android 2.2™, RIM™, and Windows™.

The authorisation system 10 is depicted as including physically separate servers, however they may be logical blocks on a fewer number of items of hardware.

The invention allows a user to be identified and authenticated as if they were on a roaming partner 3GPP/3GPP2 network, and the traffic usage generated by the user is cleared and settled in a wholesale process, in the manner of GSMA/ CIBER data-clearing. Roaming subscribers have an automated Wi-Fi attachment to a partner WISP to provide the subscriber with the same automated roaming experience to 3GPP/3GPP2 mobile network roaming access. In the 3GPP/ 3GPP2 roaming experience, the subscriber is automatically authenticated and attached to the roaming-partner's (visited) network. and their usage is cleared and settled between their operator and their roaming partner.

Thus, after initial service registration, when a user enters a WLAN the device automatically logs on in a manner which is completely transparent to the user, not requiring the user to enter any logon details such as username and password. This is analogous to 3GPP/3GPP2 roaming.

Moreover, the device sends a username and password so that the WLAN equipment can handle the access request using RADIUS.

The client software generates the logon username/password credentials each time and so they are not saved anywhere. Also, when the credentials are sent they are encrypted. There is no "session key" and the credentials are derived from information elements within the certificate.

This ability to automatically generate the credentials using the stored certificate on an ongoing basis is very advantageous. It does not require manual input by the subscriber, and so it may be used by an application on the device to perform mutual authentication with a server that is in the same trusted domain. An example is a VoIP server. The device may include a number of applications each adapted to use the received network access information to authenticate itself to a server in the same trusted domain.

The invention allows the subscribers and operators to exploit the large choice of open IEEE 802.11—compliant Wi-Fi networks worldwide. It allows their subscribers to gain Wi-Fi access to these networks, but with authentication of those subscribers. It allows smartphones to automatically roam onto international partners' Wi-Fi networks for data offload from the partners' cellular systems. The subscriber's experience should be as seamless and automatic as standard cellular roaming.

The authentication system 10 utilizes existing IP and SS7 connectivity, and includes a database of international roaming partners' Wi-Fi network information regarding access, authentication, and billing. The authentication system 10 acts as a roaming hub for bi-lateral operators.

As shown in FIG. 1, the following are the interface points:
RADIUS Authentication and Accounting interface to Wi-Fi service and Wi-Fi intermediary service:
Wi-Fi service connectivity and clearing;
The RADIUS connection will be over a permanent VPN connection, as one option.
Open and secure HTTP connection to end users via internet service connection;
Secure TCP/IP and/or HTTP connection to Operations, Administration and Maintenance
User-Interface and Management applications;
SIGTRAN/SS7 interface to an SS7 Service-Provider that can provide connectivity to the SS7 network;
Secure File-Transfer connection to Clearing servers.

Figure 2:
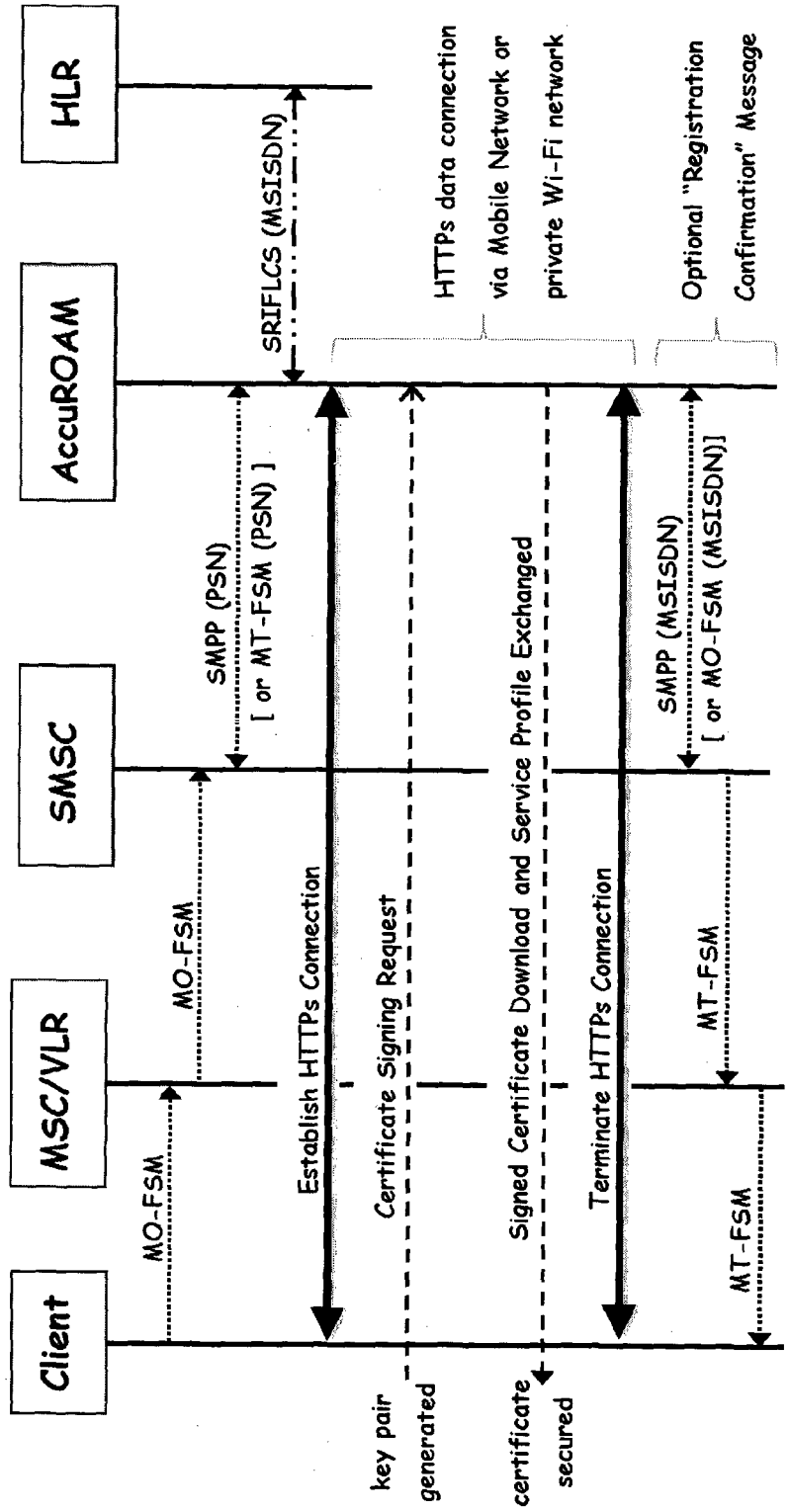
FIG. 2 is a flow diagram showing initial registration of a GSM subscriber device for authentication.
Figure 3:
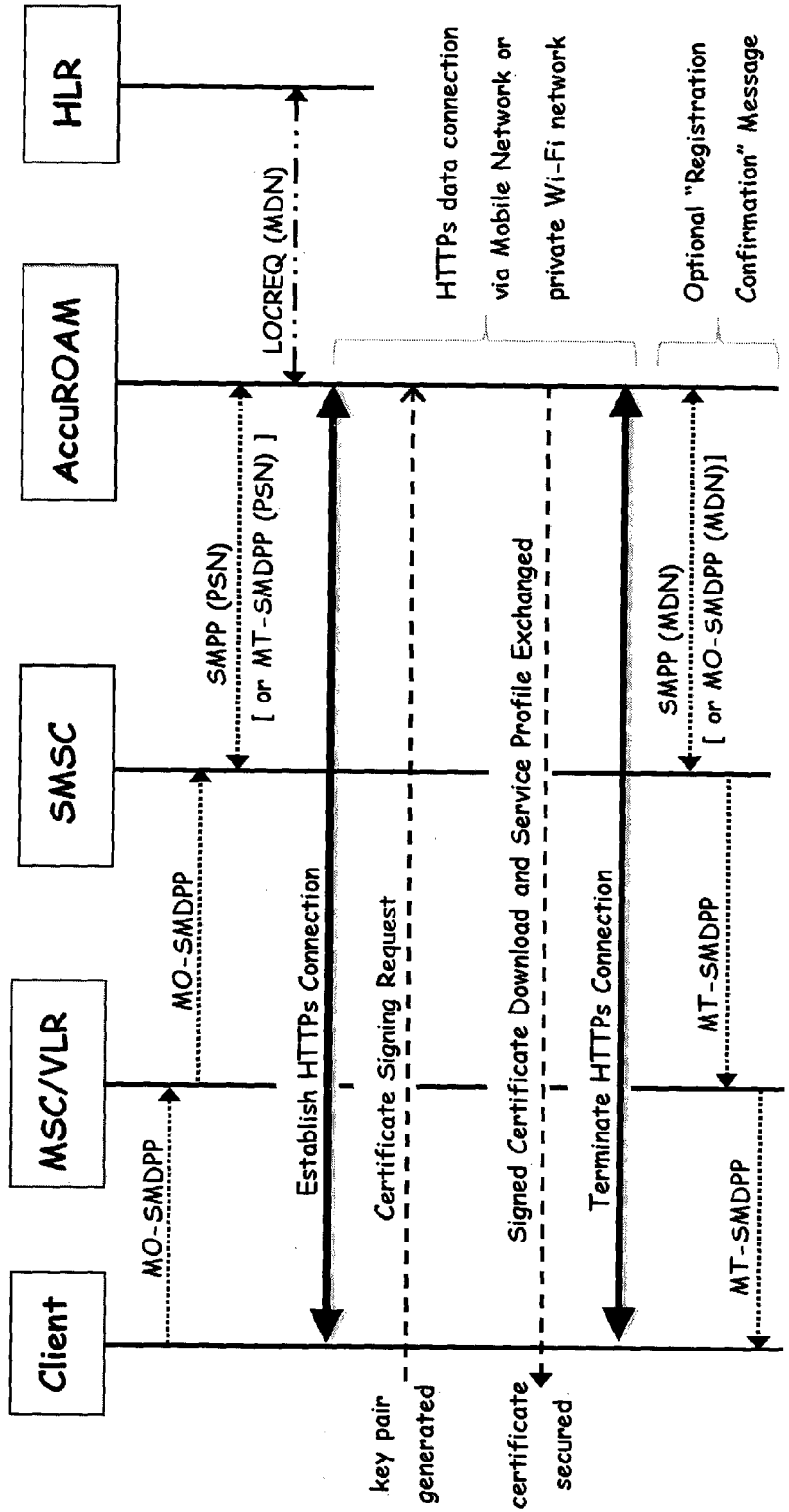
FIG. 3 is s similar flow for an ANSI subscriber.

Referring to FIGS. 2 and 3, the subscriber signs up for the service by downloading (not shown) a client from an application store. This can be done before or during registration.

There is a once-off registration phase in which the device sends registration data in a MO SMS via the mobile network 20 to the authentication system 10, and the authentication system 10 performs a query to the mobile network 20 to validate the subscriber and resolve the subscriber and device identifiers. The device 1 receives network access information from the authentication system 10, allowing it to generate network access credentials on an on-going basis. This is permanent unless the registration is revoked due, for example, to the device being stolen.

The network access information may be provided by the device 1 sending a Certificate Signing Request (CSR) and the authentication system 10 generating and signing a unique subscriber certificate and the device downloading it. The device uses the signed certificate to generate and encrypt the network access credentials for the network access.

An advantageous aspect is that the device 1 sends a token to the authentication system 10, and the authentication system 10 uses the token to sign the certificate, and the device 1 uses the token to subsequently retrieve the signed certificate. Also, the device automatically discovers a preferred WLAN service during roaming, using network selection data (service set identifiers, SSIDs) included in the network access information. Advantageously, the device generates the network access credentials transparently to the subscriber.

The device then, under control of the client, sends an SMS message via its associated mobile network, including its identifier, the MSISDN/MDN, its public key, and a nonce for the registration. The nonce is the token referred to above, and is a globally unique identifier. (GUID). The nonce is a randomly-generated number or string of characters used for the purpose of registration as an additional security measure (to ensure the SMS and the POST are from the same entity). There is an optional "Registration Confirmation" MT SMS issued by the server—otherwise the "Registration" SMS is in one direction only and is used to ensure the client information is routed through the SS7 network, which implies it was authenticated via its mobile authentication server.

The MO SMS is received by the short message gateway 8, which resolves the IMSI/MIN from the mobile network's HLR or HSS, validates the subscriber and forms the MSISDN/MDN to IMSI/MIN association.

The server 2 then generates a certificate with a key for encrypting the identifier information. The client performs a HTTPs POST to a URL hosted by the server to retrieve the signed certificate. As part of the response to the HTTPs POST, the server returns the signed certificate for the authentication requests. This is stored by the device 1 in its keychain vault, which is secure. The device then fetches its Wi-Fi profile from the server 4.

FIG. 3 shows a variation where the subscriber is an ANSI subscriber. In this case the exchange for validating the subscriber and resolving the MIN and MDNs are performed with LOCREQ (MDN) messages.

Figure 4:
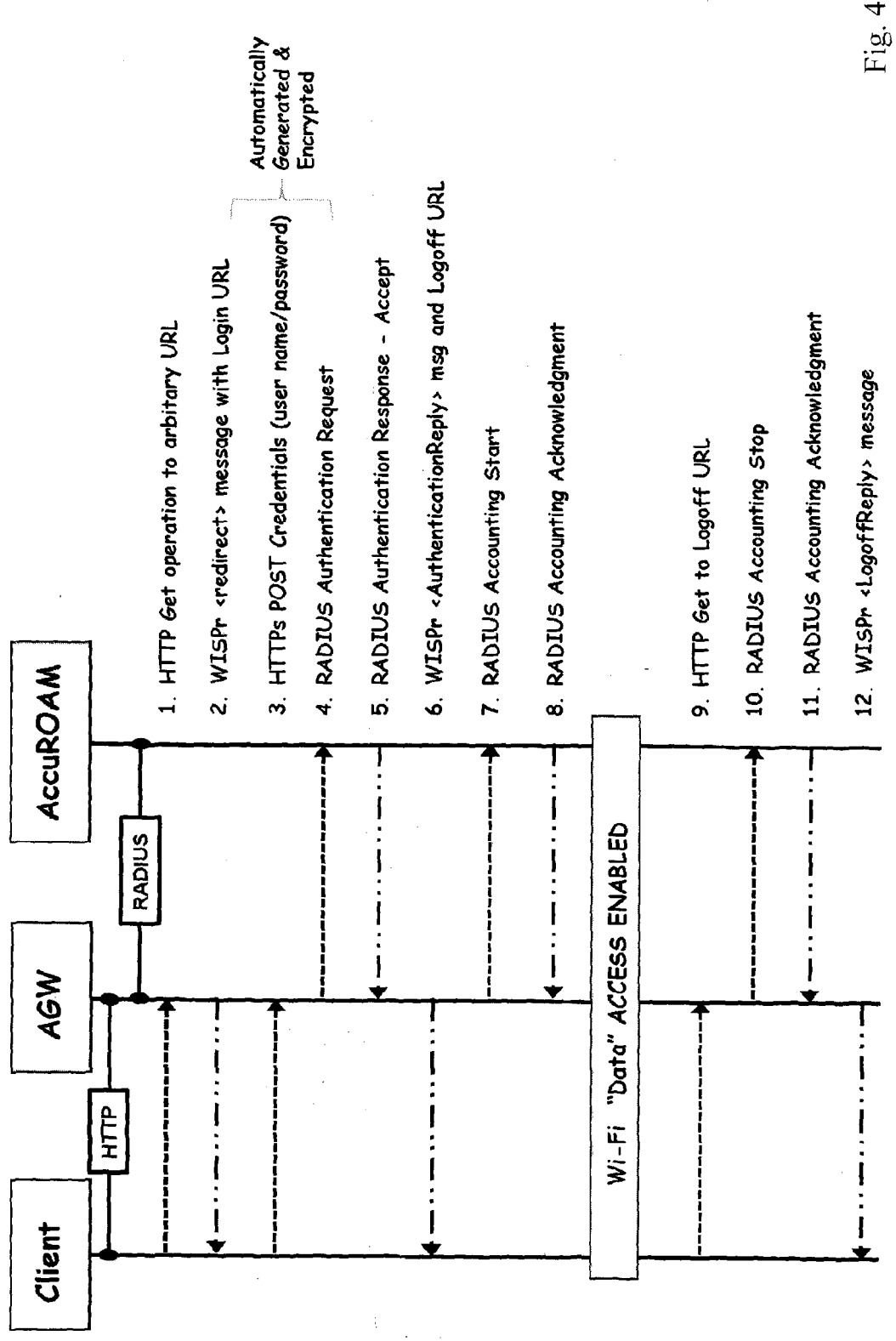
FIG. 4 is a flow diagram showing WISPr authentication after the initial registration phase.

Referring to FIG. 4 after initial registration the device 1 roams into a Wi-Fi network, the network access server of which requests the device 1 to logon. The client's response includes encrypted credentials which are passed to the authentication system via HTTP/RADIUS interworking. The authentication system decrypts the credentials and checks its authenticity. If authentic, the network access server grants access to the device and service begins.

Upon successful authentication, the invention achieves Wi-Fi hotspot roaming location management and list-distribution, to allow a mobile service provider (MSP) to control the Wi-Fi partner-network and locations to which the subscriber attaches. A WLAN roaming database installed with the device client. The WLAN roaming database is exchanged via HTTPs requests between client and server.

It will be appreciated from the above that the method relates authentication and encryption key data and X.509 certificate-based authentication to mobile subscription (MS) by:
a. Obtaining MS-related parameters from devices, surmounting particular device constraints
b. Mapping these MS data to key subscription data: e.g.: IMSI, MIN/ESN, subscription- and service-profiles.
   On some devices third-party applications such as the connectivity client are not allowed to read any subscriber-identification parameters on the mobile subscriber's UICC. Some devices do allow applications to read the physical serial number of the UICC. In such cases, the client uses "in-application" SMS, with the text of the SMS containing information unique to the mobile device client instance.
   The "in-application" SMS is mobile-originated from the device to a function within the authentication system that is performing as a Short Message Gateway. The SMS Transport-Protocol Originating Address of the SMS is in fact the MSISDN/MDN of the mobile subscriber. With the subscriber's MSIDN/MDN in-hand, the authentication system can now "reverse look-up" the mobile subscriber's IMSI or MIN, using IS-41/ITU MAP operations.
   For the case of a device of a particular type, for example, the system now has:
   The device's unique serial number;
   The SIM's or CSIM's UICC-ID;
   The mobile subscriber's MSISDN/MDN Number;
   The mobile subscriber's IMSI/MIN (reverse looked-up in the HLR);
   A unique token associated with the mobile device client instance
   In other embodiments, the SIM's or CSIM's UICC-ID may not be included.
   These are the subject matters included in the X.509 certificate of the mobile subscriber, when the authentication system receives a Certificate Signing Request from the client.
c. Creating RSA key pairs.
   Most smartphone, tablet and mobile computer devices support the creation of RSA public/private key-pairs on the device. The server has its own certificate which is signed by a trusted third party (CA) and downloaded to the device during the HTTPs session establishment The authentication system supports secure HTTP, with a certificate that the client can use to verify the system's credentials, in order to establish a Secure Socket Layer (SSL) connection for HTTPs. The client issues a Certificate Signing Request (CSR), with the same unique token as was sent by the client when it submitted the MO SMS. SCEP implementations are specific to a particular type of mobile phone.

The client is provided with the server's public key and the server is provided with the client's public key.

To recap, WISPr LO is widely deployed in public Wi-Fi networks. WISPr 1.0 is designed and intended to be implemented within a "smart client" that automatically conducts the username/password login over the Wi-Fi Access Service Network. Of course, there is a known weakness in relying on the login credentials of username/password/MAC-address, or even just username/password. Mobile service-providers want to eliminate this weakness.

Devices that Allow AccuROAM Client to Read IMSI/MIN

For devices that allow the client to read IMSI/MIN, the client will read and check the IMSI/MIN against the IMSI/MIN value in the MS Digital Certificate. If these do not agree, the client will, where possible on the device, present a UI pop-up informing the end-user that they are using a different UICC to the one used in registration.

Devices that Prohibit Client from Reading IMSI/MIN

For devices that prohibit the client to read IMSI/MIN, there is a potential security issue whereby the end-user can remove the UICC from a device, but this device will continue to authenticate successfully for the AccuROAM service.

To mitigate this risk, the IMSI/MIN-tracking capability in AccuROAM (which keeps track, through the mobile network of end-users' IMEI/MEID and IMSI/MIN pairings) can be used to detect changes of IMEI/MEID and IMSI/MIN pairings, and then trigger a Re-registration process by the device client.

The invention is not limited to the embodiments described but may be varied in construction and detail.

The invention claimed is:

1. A wireless network access method performed by a subscriber device subscribed to a home mobile network, a WLAN, and an authentication system, the method comprising the steps and sequence of:
in a once-off registration phase:
sending, by the device, registration data in a mobile originating short message via a mobile network to the authentication system,
performing a query to said home mobile network of a subscriber by the authentication system to validate the subscriber and resolve subscriber and device identifiers, and
receiving network access information from the authentication system at the device, said network access information allowing the device to generate network access credentials for a subsequent network access; and
in a network access phase:
generating network access credentials by the device, using said network access information previously received from the authentication system during the once-off registration phase; wherein
the authentication system generates and signs a unique subscriber certificate during the once-off registration phase, and the device downloads the unique subscriber certificate as part of said network access information;
the device uses said unique subscriber certificate to generate and encrypt the network access credentials during the network access phase; and
including the step of the device sending a token to the authentication system, the authentication system using the token to sign the unique subscriber certificate, and the device using the token to subsequently retrieve the signed unique subscriber certificate; and wherein the token is a nonce with a globally unique identifier (GUID) unique reference number.

2. The wireless network access method as claimed in claim 1, wherein the device downloads client software, and said client software performs the device part of the once-off registration phase and the device network access operations.

3. The wireless network access method as claimed in claim 1, wherein the authentication system generates and signs a unique subscriber certificate during the once-off registration phase, and the device downloads the unique subscriber certificate as part of said network access information.

4. The wireless network access method as claimed in claim 1, wherein the authentication system generates and signs a unique subscriber certificate during the once-off registration phase, and the device downloads the unique subscriber certificate as part of said network access information; and wherein the unique subscriber certificate includes both subscriber and device identifiers.

5. The wireless network access method as claimed in claim 1, wherein the authentication system generates and signs a unique subscriber certificate during the once-off registration phase, and the device downloads the unique subscriber certificate as part of said network access information; and including the step of the device sending a token to the authentication system, the authentication system using the token to sign the unique subscriber certificate, and the device using the token to subsequently retrieve the signed unique subscriber certificate.

6. The wireless network access method as claimed in claim 1, wherein the authentication system generates and signs a unique subscriber certificate during the once-off registration phase, and the device downloads the unique subscriber certificate as part of said network access information.

7. The wireless network access method as claimed in claim 1, wherein the authentication system generates and signs a unique subscriber certificate during the once-off registration phase, and the device downloads the unique subscriber certificate as part of said network access information; and including the step of the device sending a token to the authentication system, the authentication system using the token to sign the unique subscriber certificate, and the device using the token to subsequently retrieve the unique subscriber signed certificate; and wherein the device stores the unique subscriber certificate securely in the device.

8. The wireless network access method as claimed in claim 1, wherein during the network access phase the device automatically discovers a preferred WLAN service.

9. The wireless network access method as claimed in claim 1, wherein during the network access phase the device automatically discovers a preferred WLAN service; and wherein the discovery is performed using network selection data included in the network access information.

10. The wireless network access method as claimed in claim 1, wherein during the network access phase the device automatically discovers a preferred WLAN service; and wherein the network selection data includes service set identifiers, SSIDs.

11. The wireless network access method as claimed in claim 1, wherein the device generates the network access credentials transparently to the subscriber.

12. The wireless network access method as claimed in claim 1, wherein the network access credentials are transported using the RADIUS or the DIAMETER protocols.

13. The wireless network access method as claimed in claim 1, wherein the network access credentials are not stored, being algorithmically generated for every network access.

14. The wireless network access method as claimed in claim 1, comprising the further step of an application on the device using the received network access information to communicate with a server in the same trusted domain.

15. The wireless network access method as claimed in claim 1, comprising the further step of an application on the device using the received network access information to communicate with a server in the same trusted domain; and
   wherein the device application and the server perform mutual authentication.

16. The wireless network access method as claimed in claim 1, comprising the further step of an application on the device using the received network access information to communicate with a server in the same trusted domain; and
   wherein the device includes a plurality of applications adapted to use the received network access information to authenticate itself to a server in the same trusted domain.

17. A subscriber mobile device configured to transmit and receive radiation, the device comprising a processor, wherein the processor is adapted to perform device registration and network access steps of:
   in a once-off registration phase:
      sending, by the device, registration data in a mobile originating short message via a mobile network to the authentication system,
      performing a query to said home mobile network of a subscriber by the authentication system to validate the subscriber and resolve subscriber and device identifiers, and
      receiving network access information from the authentication system at the device, said network access information allowing the device to generate network access credentials for a subsequent network access; and in a network access phase:
   generating network access credentials by the device, using said network access information previously received from the authentication system during the once-off registration phase; wherein
   the authentication system generates and signs a unique subscriber certificate during the once-off registration phase, and the device downloads the unique subscriber certificate as part of said network access information;
   the device uses said unique subscriber certificate to generate and encrypt the network access credentials during the network access phase; and
   including the step of the device sending a token to the authentication system, the authentication system using the token to sign the unique subscriber certificate, and the device using the token to subsequently retrieve the signed unique subscriber certificate; and wherein the token is a nonce with a globally unique identifier (GUID) unique reference number.

18. A non-transitory computer readable medium comprising software code adapted to be read by a digital processor to perform the device registration and network access steps of:
   in a once-off registration phase:
      sending, by the device, registration data in a mobile originating short message via a mobile network to the authentication system,
      performing a query to said home mobile network of a subscriber by the authentication system to validate the subscriber and resolve subscriber and device identifiers, and
      receiving network access information from the authentication system at the device, said network access information allowing the device to generate network access credentials for a subsequent network access; and
   generating network access credentials by the device, using said network access information previously received from the authentication system during the once-off registration phase; wherein
   the authentication system generates and signs a unique subscriber certificate during the once-off registration phase, and the device downloads the unique subscriber certificate as part of said network access information;
   the device uses said unique subscriber certificate to generate and encrypt the network access credentials during the network access phase; and
   including the step of the device sending a token to the authentication system, the authentication system using the token to sign the unique subscriber certificate, and the device using the token to subsequently retrieve the signed unique subscriber certificate; and wherein the token is a nonce with a globally unique identifier (GUID) unique reference number.

19. A non-transitory computer readable medium comprising software code adapted to be read by a digital processor to perform the authentication system registration and network access steps of:
   in a once-off registration phase:
      sending, by the device, registration data in a mobile originating short message via a mobile network to the authentication system, performing a query to said home mobile network of a subscriber by the authentication system to validate the subscriber and resolve subscriber and device identifiers, and
      receiving network access information from the authentication system at the device, said network access information allowing the device to generate network access credentials for a subsequent network access; and
   in a network access phase:
      generating network access credentials by the device, using said network access information previously received from the authentication system during the once-off registration phase; wherein
   the authentication system generates and signs a unique subscriber certificate during the once-off registration phase, and the device downloads the unique subscriber certificate as part of said network access information;
   the device uses said unique subscriber certificate to generate and encrypt the network access credentials during the network access phase; and
   including the step of the device sending a token to the authentication system, the authentication system using the token to sign the unique subscriber certificate, and the device using the token to subsequently retrieve the signed unique subscriber certificate; and wherein the token is a nonce with a globally unique identifier (GUID) unique reference number.

20. A wireless network access method performed by a subscriber device subscribed to a home mobile network, a WLAN, and an authentication system, the method comprising the steps and sequence of:

in a once-off registration phase:
  sending, by the device, registration data in a mobile originating short message via a mobile network to the authentication system,
  performing a query to said home mobile network of a subscriber by the authentication system to validate the subscriber and resolve subscriber and device identifiers,
  receiving network access information from the authentication system at the device, said network access information allowing the device to generate network access credentials for a subsequent network access; and
in a network access phase:
  generating network access credentials by the device, using said network access information previously received from the authentication system during the once-off registration phase; wherein
the authentication system generates and signs a unique subscriber certificate during the once-off registration phase, and the device downloads the unique subscriber certificate as part of said network access information;
the device uses said unique subscriber certificate to generate and encrypt the network access credentials during the network access phase: and
including the step of the device sending a token to the authentication system, the authentication system using the token to sign the unique subscriber certificate, and the device using the token to subsequently retrieve the signed unique subscriber certificate;
and wherein the token is a nonce with a globally unique identifier (GUID) unique reference number.

21. A wireless network access method performed by a subscriber device subscribed to a home mobile network, a WLAN, and an authentication system, the method comprising the steps and sequence of:
in a once-off registration phase:
  sending, by the device, registration data in a mobile originating short message via a mobile network to the authentication system, performing a query to said home mobile network of a subscriber by the authentication system to validate the subscriber and resolve subscriber and device identifiers, and
  receiving network access information from the authentication system at the device, said network access information allowing the device to generate network access credentials for a subsequent network access; and
in a network access phase:
  generating network access credentials by the device, using said network access information previously received from the authentication system during the once-off registration phase; wherein
the authentication system generates and signs a unique subscriber certificate during the once-off registration phase, and the device downloads the unique subscriber certificate as part of said network access information;
the device uses said unique subscriber certificate to generate and encrypt the network access credentials during the network access phase; and
the device downloads the unique subscriber certificate as part of said network access information; and including the step of the device sending a token to the authentication system, the authentication system using the token to sign the unique subscriber certificate, and the device using the token to subsequently retrieve the signed unique subscriber certificate.

22. A subscriber mobile device configured to transmit and receive radiation, the device comprising a processor, wherein the processor is adapted to perform device registration and network access steps of:
in a once-off registration phase:
  sending, by the device, registration data in a mobile originating short message via a mobile network to the authentication system, performing a query to said home mobile network of a subscriber by the authentication system to validate the subscriber and resolve subscriber and device identifiers, and
  receiving network access information from the authentication system at the device, said network access information allowing the device to generate network access credentials for a subsequent network access; and
in a network access phase:
  generating network access credentials by the device, using said network access information previously received from the authentication system during the once-off registration phase; wherein
the authentication system generates and signs a unique subscriber certificate during the once-off registration phase, and the device downloads the unique subscriber certificate as part of said network access information;
the device uses said unique subscriber certificate to generate and encrypt the network access credentials during the network access phase; and
the device downloads the unique subscriber certificate as part of said network access information; and including the step of the device sending a token to the authentication system, the authentication system using the token to sign the unique subscriber certificate, and the device using the token to subsequently retrieve the signed unique subscriber certificate.

\* \* \* \* \*